United States Patent
Zhang et al.

(10) Patent No.: US 11,124,317 B2
(45) Date of Patent: Sep. 21, 2021

(54) METHOD FOR PREDICTION OF KEY PERFORMANCE PARAMETERS OF AERO-ENGINE IN TRANSITION CONDITION

(71) Applicant: DALIAN UNIVERSITY OF TECHNOLOGY, Liaoning (CN)

(72) Inventors: Shuo Zhang, Liaoning (CN); Jibang Li, Liaoning (CN); Ximing Sun, Liaoning (CN); Min Liu, Liaoning (CN)

(73) Assignee: Dalian University of Technology, Liaoning (CN)

( * ) Notice: Subject to any disclaimer, the term of this patent is extended or adjusted under 35 U.S.C. 154(b) by 140 days.

(21) Appl. No.: 16/629,513

(22) PCT Filed: Jan. 26, 2018

(86) PCT No.: PCT/CN2018/074356
§ 371 (c)(1),
(2) Date: Jan. 8, 2020

(87) PCT Pub. No.: WO2019/144386
PCT Pub. Date: Aug. 1, 2019

(65) Prior Publication Data
US 2020/0148395 A1 May 14, 2020

(51) Int. Cl.
*B64F 5/60* (2017.01)
*G01M 15/14* (2006.01)
*G06N 20/10* (2019.01)

(52) U.S. Cl.
CPC ............ *B64F 5/60* (2017.01); *G01M 15/14* (2013.01); *G06N 20/10* (2019.01)

(58) Field of Classification Search
CPC .......... B64F 5/60; G06N 20/10; G06N 3/006; G01M 15/14
See application file for complete search history.

(56) References Cited

U.S. PATENT DOCUMENTS

2004/0006398 A1* 1/2004 Bickford ............... G05B 23/021
700/30
2019/0383221 A1* 12/2019 Du ........................ B64D 31/06

FOREIGN PATENT DOCUMENTS

CN 104392039 A 3/2015
CN 107239634 A 10/2017

OTHER PUBLICATIONS

Dai et al, An Optimization Strategy for Aero-engine Transient Control Schedule Based on The On-board Adaptive Model, 2019. (Year: 2019).*

(Continued)

*Primary Examiner* — Regis J Betsch
*Assistant Examiner* — Jeremy A Delozier
(74) *Attorney, Agent, or Firm* — Muncy, Geissler, Olds & Lowe, P.C.

(57) ABSTRACT

A method for prediction of key performance parameters of an aero-engine in transition condition. Bench test data for an aero-engine in transition condition provided by a research institute is used for establishing a training dataset and a testing dataset first; parameter combination is used for predicting and analyzing engine exhaust temperature based on the idea of information fusion; and the method of rolling windows is used for rolling learning in order to predict the parameters such as low pressure rotor speed and exhaust temperature of an engine from the perspective of practical engineering application.

1 Claim, 3 Drawing Sheets

(56) References Cited

OTHER PUBLICATIONS

Farrant; Effective Condition Monitoring of Aero-engine Systems Using Automated SEM/EDX and New Diagnostic Routines, 1998. (Year: 1998).*

Li, Yanjun et al.; Forecasting of aero-engine performance trend based on fuzzy information granulation and optimized SVM; Journal of Aerospace Power; vol. 32, No. 12, Dec. 31, 2017 (Dec. 31, 2017), SSN:3022-3030; pp. 3023-3028.

Fan, Geng et al.; Probabilistic Prediction Method for Aeroengine Performance Parameters Based on Combined Optimum Relevance Vector Machine; Acta Aeronautica et Astronautica Sinica, vol. 34, No. 9, Sep. 25, 2013 (Sep. 25, 2013), ISSN: 1000-6893; 12 pages.

Li. Xiaobai et al.; Forecasting Method for Aeroengine Performance Parameters; Journal of Beijing University of Aeronautics and Astronautics; vol. 34, No. 3, Mar. 31, 2008 (Mar. 31, 2008); ISSN: 1001-5965; 4 pages.

\* cited by examiner

METHOD FOR PREDICTION OF KEY PERFORMANCE PARAMETERS OF AERO-ENGINE IN TRANSITION CONDITION

TECHNICAL FIELD

The present invention belongs to the technical field of aero-engine performance parameter prediction, and in particular relates to a method for prediction of key performance parameters of an aero-engine in transition condition.

BACKGROUND

An aero-engine is a core component of an aircraft, and its operating condition directly determines the stability and safety of the entire aircraft. While the performance of the aero-engine has been improved dramatically, the structure has become more complicated, and the monitoring and maintenance of condition have become increasingly difficult. Among others, the performance of an engine in transition condition is directly related to the performance of the aircraft to take off, accelerate and maneuver. Therefore, the requirements for the rapidity, stability, safety and reliability of the aero-engine in transition condition are extremely high. The performance parameters of the engine can reflect the health of the engine. Therefore, the key performance parameters of the engine in transition condition are predicted in order to grasp the operating condition of the engine in real time, effectively improve the current condition monitoring and fault prediction abilities of the engine, and achieve the purpose of improving the operational reliability and safety of the engine.

At present, many domestic and foreign scholars have carried out the work on aero-engine performance parameter prediction, mainly including a model-based method, a statistic-based method, a regression-based method and a machine learning-based method, wherein the model-based method is computationally complex and may have problems such as non-convergence during real-time calculation; the statistic-based method is mainly to conduct statistical analysis on engine fault, maintenance record, etc.; sometimes no obvious linear or other function relationship exists between variables in the regression-based method, so it is difficult to choose the model; whereas the machine learning-based method has a very strong nonlinear reflection ability, and a self-renewal and evolution ability; thus, it has short training time and high learning speed.

SUMMARY

Aiming at the above-mentioned defects existing in the prior art, the present invention provides a method for prediction of performance parameters of an aero-engine in transition condition based on a support vector machine (SVM), wherein bench test data for an aero-engine in transition condition provided by a research institute is used for establishing a training dataset and a testing dataset first; parameter combination is used for predicting and analyzing engine exhaust temperature based on the idea of information fusion; and the method of rolling windows is used for rolling learning, so effective online prediction is realized from the perspective of engineering application.

The technical solution of the present invention is:

A method for prediction of key performance parameters of an aero-engine in transition condition, comprising the following steps:

Step 1: conducting pretreatment on aero-engine performance parameter data (1) Aero-engine performance parameter data comprises nine groups of parameters: throttle lever angle PLA, low pressure rotor speed $n_1$, high pressure rotor speed $n_2$, environmental pressure $p_0$, outlet pressure of high pressure compressor $p_{31}$, oil pressure $p_f$, outlet temperature of the compressor $t_1$, engine exhaust temperature EGT and angle of guide vanes $\alpha_2$;

(2) Data integration: the aero-engine performance parameter data comprises data collected at multiple flight test sites. Combining and storing the data collected at flight test sites, and establishing an aero-engine performance parameter data warehouse;

(3) Resampling: analyzing the aero-engine performance parameter data. Because sampling time intervals are different, a linear resampling method is used to resample the aero-engine performance parameter data for the convenience of subsequent rolling prediction;

(4) Normalization: conducting normalization processing on the resampled aero-engine performance parameter data and converting the data into data within a certain range in order to eliminate order of magnitude differences between dimensions of data and avoid a large prediction error caused by the order of magnitude difference between input and output data. Using Min-Max scaling, and the conversion form thereof is as follow:

$$x=(x_{nor}-x_{min})/(x_{max}-x_{min})$$

where, $x_{nor}$ is the data series to be normalized, $x_{min}$ is the minimum number in the data series, and $x_{max}$ is the maximum number in the data series;

(5) Data screening and cleaning: conducting visualization processing on the normalized aero-engine performance parameter data, and conducting clustering and cleaning on acceleration curves;

Step 2: conducting dependence analysis on aero-engine performance parameter data In an early method for prediction of performance parameters of an aero-engine, a single parameter is used for prediction, which not only cannot guarantee the prediction results, but also is a great waste of data resources. Therefore, parameter combination is used for predicting and analyzing a certain parameter based on the idea of information fusion. If the dependence between the fused information is not great, the results are often not satisfactory, and even the effect of prediction by fusion is inferior to the effect of prediction by a single parameter. In the method of the present invention, dependence analysis is conducted by using a gray correlation method, and at the same time, parameters directly influencing the low pressure rotor speed are analyzed in combination with aero-engine mechanism process.

The steps of gray correlation analysis are as follows: firstly, selecting a reference sequence and denoting as $g_0$:

$$g_0=\{g_0(j)|j=1,2Kp\}=(g_0(1),g_0(2)K,g_0(p))$$

Then selecting a comparison sequence and denoting as $g_i$:

$$g_i=\{g_i(j)|j=1,2,Kp\}=(g_i(1),g_i(p)),i=1,2,K,q$$

Calculating the mean value of the correlation coefficients of various indicators of each evaluation object respectively in order to reflect the correlation relation between the comparison sequence $g_i$ and the reference sequence $g_0$ of each evaluation object, which is called the correlation and denoted as:

$$r_i = \frac{1}{n}\sum_{j=1}^{n}\xi_i(j)$$

where, the correlation coefficient $\xi_i(j)$ is calculated as follow:

$$\xi_i(j) = \frac{\min_i \min_j |g_0(j)-g_i(j)| + \rho\max_i \max_j |g_0(j)-g_i(j)|}{|g_0(j)-g_i(j)| + \rho\max_i \max_j |g_0(j)-g_i(j)|}$$

Finally, selecting three parameters, i.e. the throttle lever angle PLA, the oil pressure $p_f$ and the angle of guide vanes $\alpha_2$, as input variables, and the low pressure rotor speed $n_1$ as an output variable;

Step 3: establishing a training database

Establishing a training database by using the method of rolling windows in order to reflect the time-varying characteristics of the performance parameters of an engine in transition condition, with a sketch map shown in FIG. 2. Two data windows are provided in the figure. The solid box is an input data window, and the dotted box is an output data window (also called a prediction window). The widths of the two windows are $T_D$ and $T_P$ respectively; the input data window and the output data window move together to the right at a step width of $T_M$ ($T_M$ is the moving step width) to obtain dynamic process data fragments at different time, thus obtaining the corresponding input-output data vector pairs.

Defining the input-output vector pair corresponding to the $k^{th}$ data window as $\{X(T_k), T, Y(T_k)\}$, assuming the selected performance parameters are $Para_1$, $Para_2$, L and $Para_n$, and predicting the parameter $Para_i$, then:

$$X(T_k)=[T_k, x(T_k), x(T_k-1\tau), L, x(T_k-m\tau)]$$

$$x(T_k)=[Para_1(T_k), L, Para_n(T_k)]$$

$$m=T_D/\tau$$

$$Y(T_k)=Para_i(T_k+T_p)$$

where, $T_k$ is the time corresponding to the right end of the input data window, $\tau$ is a discrete step length, m is an equally divide number of the input data window, the input vector $X(T_k)$ is composed of $T_k$ and (m+1) discrete values of process variables at sampling time covered by the closed interval of the data window, and the output vector $Y(T_k)$ is the actual value of the variable Para to be predicted of the time $(T_k+T_p)$ corresponding to the right end of the output data window;

Step 4: building a prediction model based on support vector regression

This step is mainly composed of two parts: firstly, conducting rolling learning prediction on low pressure rotor speed $n_1$ by using an SVM, and then optimizing the SVM by a swarm intelligence algorithm to build the prediction model.

(1) Conducting rolling learning prediction on low pressure rotor speed $n_1$ by using an SVM;

In a real classification decision, it is often difficult to determine an appropriate kernel function to make a training sample linearly separable in a feature space. Even if the training sample is linearly separable, it is difficult to determine that the results are not caused by overfitting. In order to alleviate this problem, the SVM is allowed to classify some samples incorrectly.

That is, a concept of "soft margin" is introduced to allow some samples to fail to meet the constraint condition: $y_i(\omega^T x_i+b) \geq 1$.

The commonly used soft margin SVM is:

$$\min_{\omega,b} \frac{1}{2}\|\omega\|^2 + C\sum_{i=1}^{m}\xi_i$$

The constraint conditions to be met are:

$$y_i(\omega^T x_i+b) \geq 1-\xi_i$$

$$\xi_i \geq 0, i=1, \ldots, m$$

At this point, the constraint conditions of the dual problem in the optimization of objective function convex quadratic programming can be changed to:

$$\begin{cases} 0 \leq \alpha_i \leq C \\ \sum_{i=1}^{N} \alpha_i y_i = 0 \end{cases}$$

Considering that the number of kernel parameters of the Gaussian Radial Basis (RBF) is small, it is easy to optimize the parameters subsequently, and make the model relatively stable at the same time. Selecting an RBF kernel function $k(x, x_i) = e^{\|x-x_i\|^2/\sigma^2}$ for the SVM, wherein $\sigma$ is a kernel parameter whose value can influence the shape of the kernel function, that is, the greater $\sigma$ is, the lower the nonlinear efficacy is, and the lower the sensitivity to noise is. x and $x_i$ are samples.

(2) Optimizing the parameters of the SVM by a swarm intelligence algorithm

Optimizing the parameters such as C, $\sigma$ in the SVM by a particle swarm algorithm. The particle swarm algorithm is to initialize a group of particles in the search space firstly, and each particle may be the potential optimal solution of extreme optimization problems. Using three indicators, i.e. position, speed and fitness value, to represent the characteristics of the particles, and using fitness value to measure the quality of the particles.

Assuming that in the d-dimensional search space, a population $T=(T_1, T_2, \ldots, T_n)$ is composed of n particles, wherein the $i^{th}$ particle represents a d-dimensional vector $T_i=(t_{i1}, t_{i2}, \ldots, t_{id})$.

Letting the speed of the $i^{th}$ particle be $V_i=(V_{i1}, V_{i2}, \ldots, V_{id})^T$, the individual extreme thereof be $P_i=(P_{i1}, P_{i2}, \ldots, P_{id})^T$, and the extreme of the population be $P_g=(P_{g1}, P_{g2}, \ldots, P_{gd})^T$. In each iteration, the updated formulas of the speed and position of the particles can be expressed as:

$$V_{ij}^{s+1} = wV_{ij}^s + c_1 r_1(P_{ij}^s - T_{ij}^s) + c_2 r_2(P_{gj}^s - T_{ij}^s)$$

$$T_{ij}^{s+1} = T_{ij}^s + V_{ij}^{2+1}$$

where, w is inertia weight, s is the current number of iterations, $V_{ij}$ is the speed of the particles, acceleration factors $c_1, c_2 \geq 0$, and random numbers $r_1, r_2 \in [0,1]$.

The classification accuracy of cross validation is used as an indicator of the fitness value in the characteristics of the particles.

step 5: testing the prediction model by using a testing dataset, and evaluating the prediction Effect The main evaluating indicators comprise:

(1) Mean relative error (MRE) and 70-batches overall mean relative error (A_MRE)

The formula of the MRE is:

$$MRE_j = \left(\frac{1}{n}\sum_{i=1}^{n}\frac{|\hat{x}_{ij} - x_{ij}|}{x_{ij}}\right) \times 100\%,$$

$i = 1, 2, L, n; j = 1, 2, L, N$

Then the 70-batches AMRE is:

$$A\_MRE = \sum_{j=1}^{N} MRE_j/N,$$

$j = 1, 2, L, N$ (2) the 70-batches highest value of maximum relative error (MAX_MAXRE)

During test, the value of earlier stage of the EGT is relatively small, so even if the prediction effect is good, the relative error of the EGT is still large; therefore, the analysis of the maximum relative error is divided into two parts, one is to find the maximum relative error of the whole time series, and the other is to find the maximum relative error starting from the $30^{th}$ moment.

The formulas of the maximum relative error are:

$$MAXRE1_j = \max\left(\frac{|\hat{x}_{ij} - x_{ij}|}{x_{ij}}\right) \times 100\%,$$

$i = 1, 2, L, n; j = 1, 2, L, N$ $$MAXRE2_j = \max\left(\frac{|\hat{x}_{ij} - x_{ij}|}{x_{ij}}\right) \times 100\%,$$

$i = 31, 32, L, n; j = 1, 2, L, N$

Then the 50-batches MAX MAXREs are:

MAX_MAXRE1=max(MAXRE1$_j$), $j=1,2,L,N$

MAX_MAXRE2=max(MAXRE2$_j$), $j=1,2,L,N$ (3) Root mean square error (RMSE) and 70-batches overall mean root mean square error (A_RMSE)

The RMSE is:

$$RMSE_j = \sqrt{\frac{\sum_{i=1}^{n}(\hat{x}_{ij} - x_{ij})^2}{n-1}},$$

$i = 1, 2, L, n; j = 1, 2, L, N$

Then the 70-batches A_RMSE is:

$$A\_RMSE = \sum_{j=1}^{N} RMSE_j/N,$$

$j = 1, 2, L, N$ where, $\hat{x}_{ij}$ is a prediction value of the current batch$^j$ at the $i^{th}$ moment; $x_{ij}$ is an observation value; N is the total number of batches, i.e. 70; and n is the length of the time series of the current batch$^j$.

The present invention has the following beneficial effects that: the present invention provides a method for prediction of key performance parameters of an aero-engine in transition condition based on a support vector machine (SVM). It conducts parameter optimization on the SVM by an intelligence algorithm so that to predict the parameters such as low pressure rotor speed and exhaust temperature of an engine from the perspective of practical engineering application.

DETAILED DESCRIPTION

Figure 1:
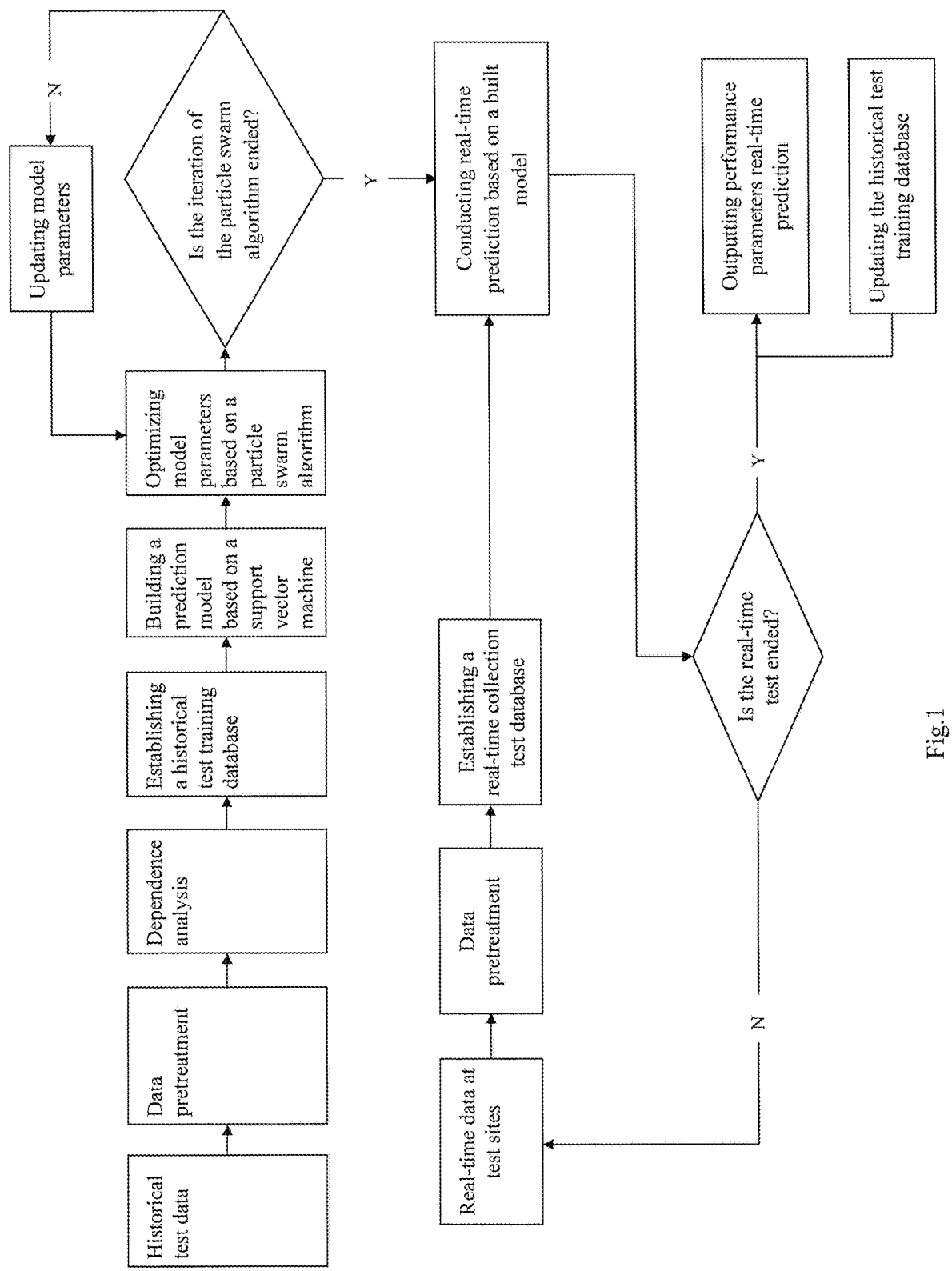
FIG. 1 is a flow chart of building a prediction model of performance parameters of an aero-engine in transition condition.
Figure 2:
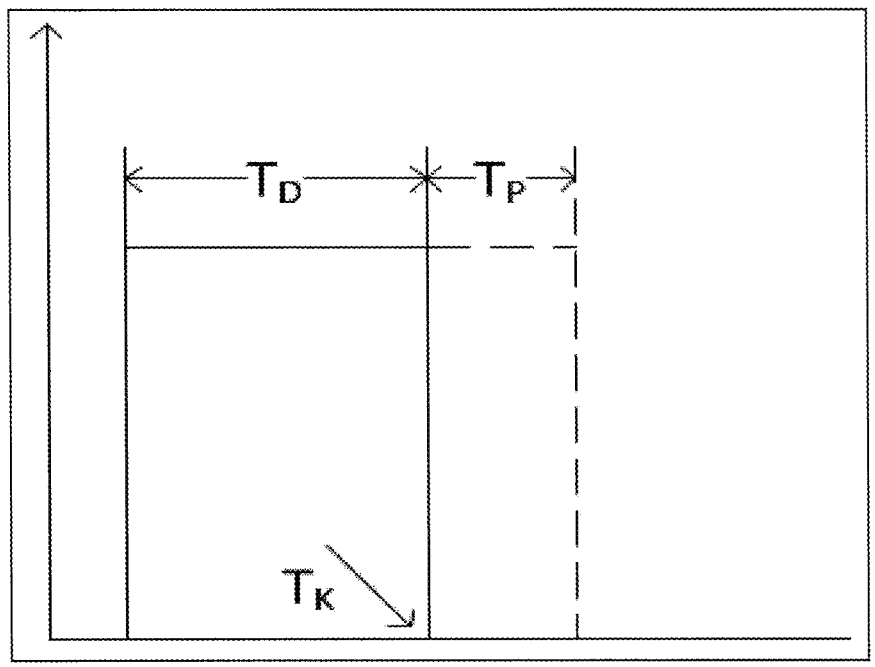
FIG. 2 is the sketch map for method of rolling windows.

Specific embodiment of the present invention is further described below in combination with accompanying drawings and the technical solution.

The data used is 180 groups of bench test data for a certain type of aero-engine in transition condition provided by a domestic research institute.

Step 1: conducting pretreatment on aero-engine performance parameter data (1) The data mainly comprises nine groups of parameters: throttle lever angle PLA, low pressure rotor speed $n_1$, high pressure rotor speed $n_2$, environmental pressure $p_0$, outlet pressure of high pressure compressor $p_{31}$, oil pressure $p_f$, outlet temperature of the compressor $t_1$, engine exhaust temperature EGT and angle of guide vanes $\alpha_2$.

(2) Data integration: combining and storing the data in multiple data sources (such as excel and txt), and establishing an aero-engine performance parameter data warehouse.

(3) Resampling: analyzing the parameter data collected. Because sampling time intervals are different, resampling is conducted to the data first for the convenience of subsequent rolling prediction. The specific steps are as follows: using an interpolation method to insert the newly proposed sampling frequency as an interpolation into the time series of the original data, and then counting the number of original data between every two rated sampling points. If only one original data is included, taking the original data as the data corresponding to the sampling point; if two original data are included, calculating the mean value of the two original data, and taking the mean value as the data corresponding to the time point; and if no original data is included, taking the mean value of the data corresponding to the previous time point and the next time point of the time point in the rated time series as the data of the time point.

(4) Normalization: conducting normalization processing on the data, converting the data into data within a certain range, and using Min-Max scaling; the conversion form of Min-Max scaling is as follows:

$$x=(x_{nor}-x_{min})/(x_{ax}-x_{min})$$

where, $x_{nor}$ is the data series to be normalized, $x_{min}$ is the minimum number in the data series, and $x_{max}$ is the maximum number in the data series;

(5) Data screening and cleaning: conducting visualization processing on the data in order to conduct simple clustering and cleaning on acceleration curves.

Step 2: Conducting Dependence Analysis on Parameters

In the present invention, dependence analysis is conducted by using a gray correlation method, and at the same time, parameters directly influencing the low pressure rotor speed are analyzed in combination with aero-engine mechanism process.

Finally, selecting three parameters, i.e. the throttle lever angle PLA, the oil pressure $p_f$ and the angle of guide vanes $\alpha_2$, as input variables, and the low pressure rotor speed $n_1$ as an output variable. It can also be verified from the experimental results that the joint prediction of the three parameters after fusion achieves a relatively good effect.

Step 3: Establishing a Training Database

Randomly selecting 110 groups of data as a training dataset, and 70 groups of data as a testing dataset. Related parameters of the tested training database are set as $T_D$=0.5 s, $T_P$=2.0 s, $T_M$=0.1 s and τ=0.1 s. That is, the input data is:

$$X(t) = \begin{bmatrix} x(t) \\ x(t-0.1) \\ x(t-0.2) \\ x(t-0.3) \\ x(t-0.4) \end{bmatrix}, t = 0.5, 0.6, L, L$$

The output data is:

$$Y(t+2)=[N1(t+2)]$$

where x(t)=[ PLA(t), pf (t), $\alpha_2$(t)], and L is the duration of each test.

That is, conducting predication with a leading time of 2 s, rolling 0.1 s to the right of the time axis after each predication, continuing to conduct another predication, and so on. As the duration of each test is different, the number of training samples will be gradually reduced from 110 groups over time.

Step 4: Building a Prediction Model

In addition to a particle swarm optimization-based support vector machine (PSO-SVM) model provided in the present invention, a kernel extreme learning machine (KELM) model and a quantum-behaved particle swarm optimization-based least squares support vector machine (QPSO-LSSM) model are also used as comparisons, wherein an RBF kernel function is used for the KELM, and parameter C=160. Considering the requirement for computation efficiency in engineering practice, the population size of the search algorithm of the QPSO-LSSVM is set to 3, and the maximum number of iterations is set to 7.

Step 5: Conducting Result Discussion and Indicator Comparison

Using the method provided by the present invention and the two above-mentioned comparison methods. Using the training dataset to train the models, and using the testing dataset to analyze and compare the prediction effects of the models. Calculating four indicators, i.e. 70-batches overall mean relative error (A_MRE), maximum relative errors (MAX MAXRE1 and MAX MAXRE2) and 70-batches overall mean root mean square error (A_RMSE), respectively. The N1 indicators predicted by the models are shown in Table 1.

TABLE 1

Indicators of Prediction Results of Different Algorithms on N1 of Aero-Engine in Transition Condition

| Algorithm | A_MRE (%) | A_RMSE(%) | MAX_MAXRE1(%) | MAX_MAXRE2(%) |
|---|---|---|---|---|
| KELM | 1.53 | 2.39 | 23.33 | 8.49 |
| QPSO-LSSVM | 1.36 | 2.25 | 20.78 | 16.43 |
| PSO-SVM | 0.97 | 1.71 | 18.80 | 6.73 |

Figure 3:
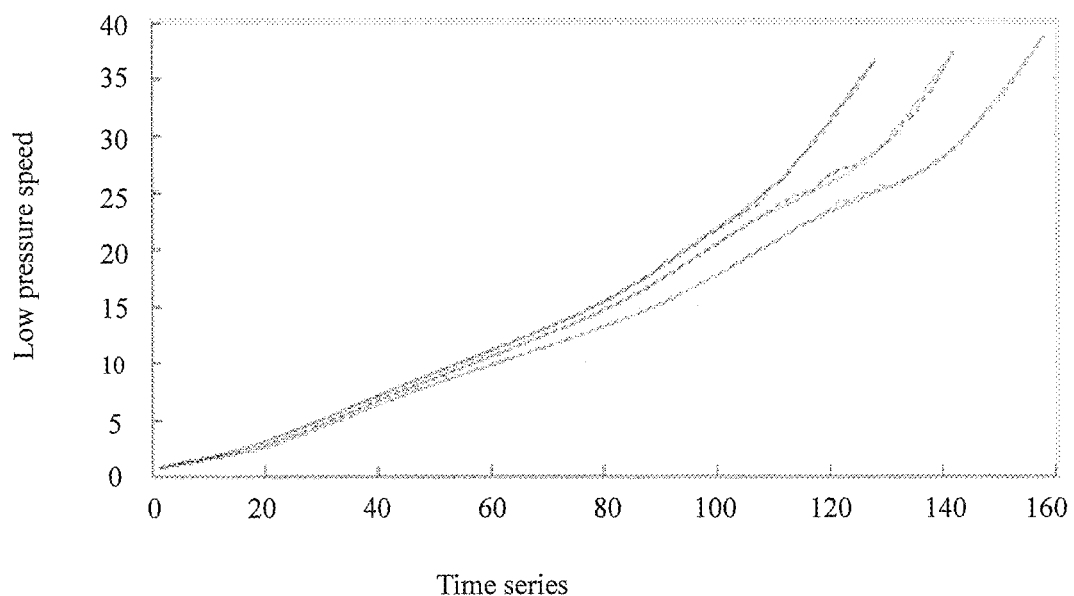
FIG. 3 is the trend chart of 3-batches forecasting results of N1.
Figure 4:
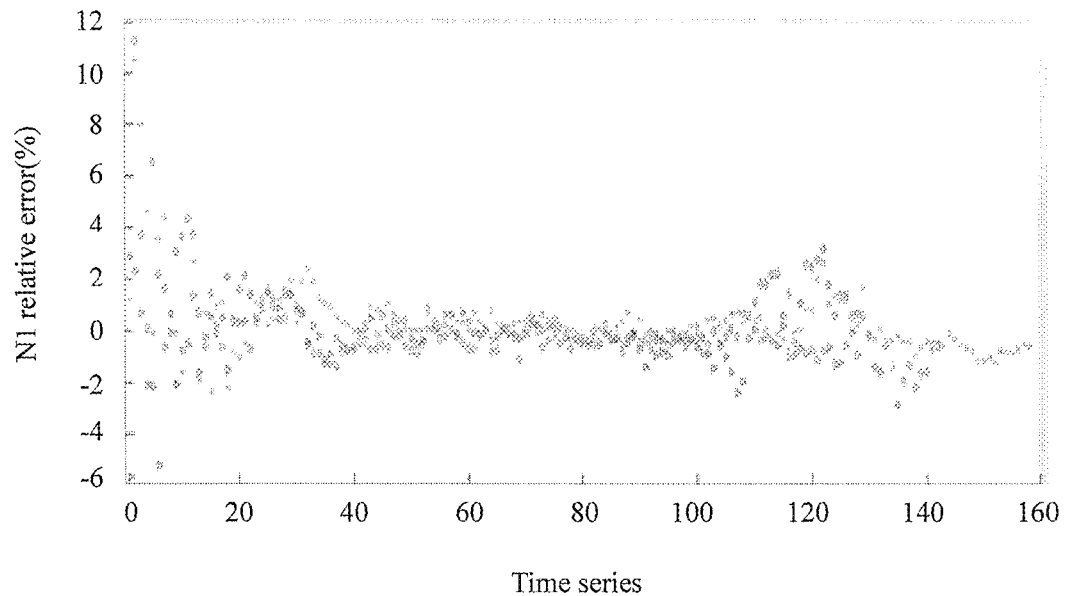
FIG. 4 is the error chart of 3-batches forecasting results of N1.

At the same time, FIG. 3 is the trend chart of the results predicted by the PSO-SVM model on three batches in the testing dataset (three typical batches with large errors are selected), wherein the solid line represents the observation value, and the dotted line represents the predication value. It can be seen from the figure that the rising and falling trends of the prediction curve and the original observation curve are approximately the same, and at the inflection points of the curves (i.e. at different power switching moments), the prediction curve can change with the slope of the original curve, which also means that an engine modality variation can be reasonably predicted 2 s in advance by the method of the present invention. FIG. 4 shows the relative errors corresponding to the 3-batches prediction.

Figure 5:
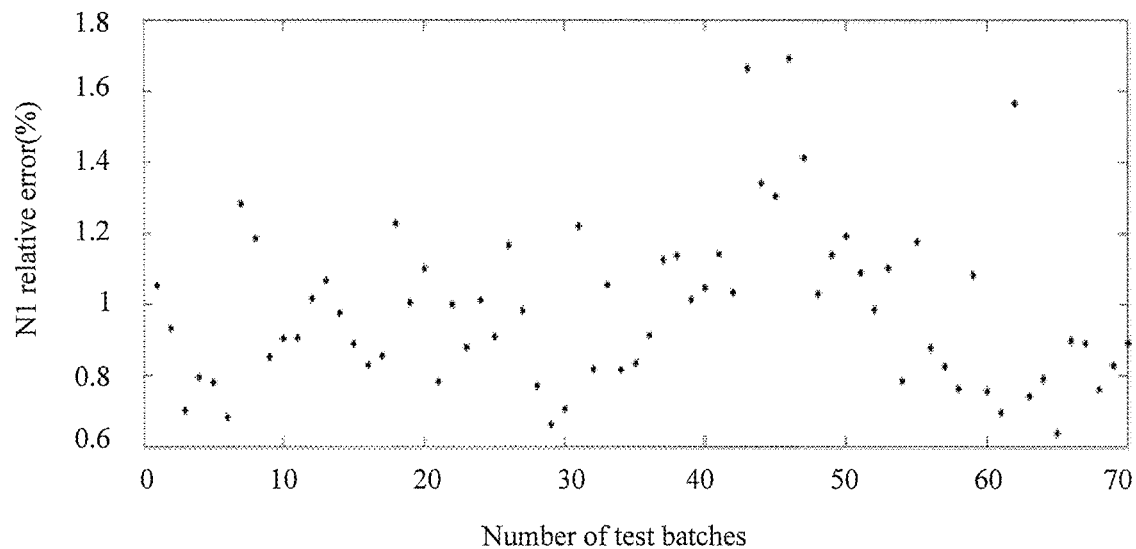
FIG. 5 is the scatter gram of 70-testing-batches predication error of N1 (leading time=2 s).

As shown in FIG. 5, the abscissa in the figure is the number of test batches, which is 70 in total.

The ordinate is the mean value of the relative errors of each batch of low pressure rotor speed. Except that the relative errors of a few batches are greater than +1.4%, the errors of the remaining batches are basically distributed in the interval of [0.8%,1.2%], that is, the method achieves a relatively good prediction effect for all test samples.

The invention claimed is:

1. A method for prediction of key performance parameters of an aero-engine in transition condition, comprising the following steps:
   step 1: conducting pretreatment on aero-engine performance parameter data
   (1) aero-engine performance parameter data comprises nine groups of parameters: throttle lever angle PLA, low pressure rotor speed $n_1$, high pressure rotor speed $n_2$, environmental pressure $p_0$, outlet pressure of high pressure compressor $p_{31}$, oil pressure $p_f$, outlet temperature of the compressor $t_1$, engine exhaust temperature EGT and angle of guide vanes $\alpha_2$;
(2) data integration: the aero-engine performance parameter data comprises data collected at multiple flight test sites; combining and storing the data collected at flight test sites, and establishing an aero-engine performance parameter data warehouse;
(3) resampling: analyzing the aero-engine performance parameter data, and using a linear resampling method to resample the aero-engine performance parameter data;
(4) normalization: conducting normalization processing on the resampled aero-engine performance parameter data, and using Min-Max scaling; the conversion form of Min-Max scaling is as follow:

$$x=(x_{nor}-x_{min})/(x_{max}-x_{min})$$

where, $x_{nor}$ is the data series to be normalized, $x_{min}$ is the minimum number in the data series, and $x_{max}$ is the maximum number in the data series;
(5) data screening and cleaning: conducting visualization processing on the normalized aero-engine performance parameter data, and conducting clustering and cleaning on acceleration curves;
step 2: conducting dependence analysis on aero-engine performance parameter data in the method of the present invention, dependence analysis is conducted by using a gray correlation method, and at the same time, parameters directly influencing the low pressure rotor speed are analyzed in combination with aero-engine mechanism process;
the steps of gray correlation analysis are as follows:
firstly, selecting a reference sequence and denoting as $g_0$:

$$g_0=\{g_0(j)|j=1,2Kp\}=(g_0(1),g_0(2)K,g_0(p))$$

then selecting a comparison sequence and denoting as $g_i$:

$$g_i=\{g_i(j)|j=1,2,Kp\}=(g_i(1),g_i(p)), i=1,2,K,q$$

calculating the mean value of the correlation coefficients of various indicators of each evaluation object respectively in order to reflect the correlation relation between the comparison sequence $g_i$ and the reference sequence $g_0$ of each evaluation object, which is called the correlation and denoted as:

$$r_i = \frac{1}{n}\sum_{j=1}^{n}\xi_i(j)$$

where, the correlation coefficient $\zeta_i(j)$ is calculated as follow:

$$\xi_i(j) = \frac{\min_i\min_j|g_0(j)-g_i(j)|+\rho\max_i\max_j|g_0(j)-g_i(j)|}{|g_0(j)-g_i(j)|+\rho\max_i\max_j|g_0(j)-g_i(j)|}$$

finally, selecting three parameters, i.e. the throttle lever angle PLA, the oil pressure $p_f$ and the angle of guide vanes $\alpha_2$, as input variables, and the low pressure rotor speed $n_1$ as an output variable;
step 3: establishing a training database;
establishing a training database by using the method of rolling windows in order to reflect the time-varying characteristics of the performance parameters of an engine in transition condition, and assuming that two data windows are provided, i.e. an input data window and an output data window, whose widths are $T_D$ and $T_p$ respectively; the input data window and the output data window move together to the right at a step width of $T_M$ to obtain dynamic process data fragments at different time, thus obtaining the corresponding input-output data vector pairs;
defining the input-output vector pair corresponding to the $k^{th}$ data window as $\{X(T_k),Y(T_k)\}$, assuming the selected performance parameters are $Para_1$, $Para_2$, L and $Para_n$, and predicting the parameter $Para_i$, then:

$$X(T_k)=[T_k,x(T_k),x(T_k-1\tau),L,x(T_k-m\tau)]$$

$$x(T_k)=[Para_1(T_k),L,Para_n(T_k)]$$

$$m=T_D/\tau$$

$$Y(T_k)=Para_i(T_k+T_p)$$

where, $T_k$ is the time corresponding to the right end of the input data window, $\tau$ is a discrete step length, m is an equally divide number of the input data window, the input vector $X(T_k)$ is composed of $T_k$ and (m+1) discrete values of process variables at sampling time covered by the closed interval of the data window, and the output vector $Y(T_k)$ is the actual value of the variable $Para_i$ to be predicted of the time $(T_k+T_P)$ corresponding to the right end of the output data window;
step 4: building a prediction model based on support vector regression
this step is mainly composed of two parts: firstly, conducting rolling learning prediction on low pressure rotor speed $n_1$ by using a support vector machine (SVM), and then optimizing the SVM by a swarm intelligence algorithm to build the prediction model;
(1) conducting rolling learning prediction on low pressure rotor speed $n_1$ by using an SVM
introducing a concept of "soft margin" to allow some samples to fail to meet the constraint condition: $y_i(\omega^T x_i+b) \geq 1$;
the used soft margin SVM is:

$$\min_{\omega,b} \frac{1}{2}\|\omega\|^2 + C\sum_{i=1}^{m}\xi_i$$

the constraint conditions to be met are:

$$y_i(\omega^T x_i+b) \geq 1-\xi_i$$

$$\xi_i \geq 0, i=1,\ldots,m$$

at this point, the constraint conditions of the dual problem in the optimization of objective function convex quadratic programming are changed to:

$$\begin{cases} 0 \leq \alpha_i \leq C \\ \sum_{i=1}^{N}\alpha_i y_i = 0 \end{cases}$$

selecting an RBF kernel function $k(x, x_i)=e^{\|x-x_i\|^2/\sigma^2}$ for the SVM, wherein $\sigma$ is a kernel parameter whose value can influence the shape of the kernel function, that is, the greater a is, the lower the nonlinear efficacy is, and the lower the sensitivity to noise is; and x and $x_i$ are samples;

(2) optimizing the parameters of the SVM by a swarm intelligence algorithm optimizing the parameters C, σ in the SVM by a particle swarm algorithm; the particle swarm algorithm is to initialize a group of particles in the search space firstly, and each particle may be the potential optimal solution of extreme optimization problems; using three indicators, i.e. position, speed and fitness value, to represent the characteristics of the particles, and using fitness value to measure the quality of the particles;

assuming that in the d-dimensional search space, a population $T=(T_1, T_2, \ldots, T_n)$ is composed of n particles, wherein the $i^{th}$ particle represents a d-dimensional vector $T_i=(t_{i1}, t_{i2}, \ldots, t_{id})$;

letting the speed of the $i^{th}$ particle be $V_i=(V_{i1}, V_{i2}, \ldots, V_{id})^T$, the individual extreme thereof be $P_i=(P_{i1}, P_{i2}, \ldots, P_{id})^T$, and the extreme of the population be $P_g=(P_{g1}, P_{g2}, \ldots, P_{gd})^T$; in each iteration, the updated formulas of the speed and position of the particles are expressed as:

$$V_{ij}^{s+1} = wV_{ij}^s + c_1 r_1 (P_{ij}^s - T_{ij}^s) + c_2 r_2 (P_{gj}^s - T_{ij}^s)$$

$$T_{ij}^{s+1} = T_{ij}^s + V_{ij}^{s+1}$$

where, w is inertia weight, s is the current number of iterations, $V_{ij}$ is the speed of the particles, acceleration factors $c_1, c_2 \geq 0$, and random numbers $r_1, r_2 \in [0,1]$;

using the classification accuracy of cross validation as an indicator of the fitness value in the characteristics of the particles;

step 5: testing the prediction model by using a testing dataset, and evaluating the prediction effect the main evaluating indicators comprise:

(1) mean relative error (MRE) and 70-batches overall mean relative error (A_MRE)

the formula of the MRE is:

$$MRE_j = \left( \frac{1}{n} \sum_{i=1}^{n} \frac{|\hat{x}_{ij} - x_{ij}|}{x_{ij}} \right) \times 100\%,$$

$i = 1, 2, L, n; j = 1, 2, L, N$ then the 70-batches A_MRE is:

$$A\_MRE = \sum_{j=1}^{N} MRE_j / N,$$

$j = 1, 2, L, N$ (2) the 70-batches highest value of maximum relative error (MAX_MAXRE)

during test, the value of earlier stage of the EGT is relatively small, so even if the prediction effect is good, the relative error of the EGT is still large; therefore, the analysis of the maximum relative error is divided into two parts, one is to find the maximum relative error of the whole time series, and the other is to find the maximum relative error starting from the $30^{th}$ moment;

the formulas of the maximum relative error are:

$$MAXRE1_j = \max\left( \frac{|\hat{x}_{ij} - x_{ij}|}{x_{ij}} \right) \times 100\%,$$

$i = 1, 2, L, n; j = 1, 2, L, N$ $$MAXRE2_j = \max\left( \frac{|\hat{x}_{ij} - x_{ij}|}{x_{ij}} \right) \times 100\%,$$

$i = 31, 32, L, n; j = 1, 2, L, N$ $$MAX\_MAXRE1 = \max(MAXRE1_j),$$

$j=1,2,L,N$ $$MAX\_MAXRE2 = \max(MAXRE2_j),$$

$j=1,2,L,N$ (3) root mean square error (RMSE) and 70-batches overall mean root mean square error (A_RMSE)

the RMSE is:

$$RMSE_j = \sqrt{\frac{\sum_{i=1}^{n} (\hat{x}_{ij} - x_{ij})^2}{n-1}},$$

$i = 1, 2, L, n; j = 1, 2, L, N$ then the 70-batches A_RMSE is:

$$A\_RMSE = \sum_{j=1}^{N} RMSE_j / N,$$

$j = 1, 2, L, N$ where, $\hat{x}_{ij}$ is a prediction value of the current batch$^j$ at the $i^{th}$ moment; $x_{ij}$ is an observation value; N is the total number of batches, i.e. 70; and n is the length of the time series of the current batch$^j$.

* * * * *